United States Patent
Tzannes

(10) Patent No.: US 7,649,928 B2
(45) Date of Patent: *Jan. 19, 2010

(54) METHOD FOR SYNCHRONIZING SEAMLESS RATE ADAPTATION

(76) Inventor: Marcos C. Tzannes, 121 La Espiral, Orinda, CA (US) 94563

( * ) Notice: Subject to any disclaimer, the term of this patent is extended or adjusted under 35 U.S.C. 154(b) by 0 days.

This patent is subject to a terminal disclaimer.

(21) Appl. No.: 11/678,388

(22) Filed: Feb. 23, 2007

(65) Prior Publication Data

US 2007/0133705 A1 Jun. 14, 2007

Related U.S. Application Data

(63) Continuation of application No. 10/663,801, filed on Sep. 17, 2003, now abandoned, which is a continuation of application No. 09/523,086, filed on Mar. 10, 2000, now Pat. No. 6,667,991.

(60) Provisional application No. 60/124,222, filed on Mar. 12, 1999, provisional application No. 60/161,115, filed on Oct. 22, 1999, provisional application No. 60/177,081, filed on Jan. 19, 2000.

(51) Int. Cl.
*H04B 1/38* (2006.01)

(52) U.S. Cl. ...................... 375/219; 375/222

(58) Field of Classification Search ........... 375/222, 375/219
See application file for complete search history.

(56) References Cited

U.S. PATENT DOCUMENTS

| | | | |
|---|---|---|---|
| 3,573,380 A | 4/1971 | Darlington | |
| 4,131,766 A | 12/1978 | Narasimha | |
| 4,568,156 A | 2/1986 | Dane | |
| 4,679,227 A | 7/1987 | Hughes-Hartogs | |
| 4,731,816 A | 3/1988 | Hughes-Hartogs | |
| 4,802,190 A | 1/1989 | Schouhamer Immink | |
| 4,912,763 A | 3/1990 | Galand et al. | |

(Continued)

FOREIGN PATENT DOCUMENTS

EP  0473465  3/1992

(Continued)

OTHER PUBLICATIONS

ITU G.992.1 ("Draft new Recommendation G.992.1: Asymmetrical Digital Subscriber Line (ADSL) Transceiver." ITU—Telecommunication Standardization Sector Temporary Document 44 (PLEN) Study Group 15 Original: English, Geneva, Oct. 12-23, 1998, pp. 119-122 and 213-224.*

(Continued)

*Primary Examiner*—Juan A Torres
(74) *Attorney, Agent, or Firm*—Schwabe, Williamson & Wyatt, P.C.

(57) ABSTRACT

A Discrete Multitone Modulation (DMT) system and method with the capability to adapt the system bit rate on-line in a seamless manner. The DMT system provides a robust and fast protocol for completing this seamless rate adaptation. The DMT system also provides a framing and encoding method with reduced overhead compared to conventional DMT systems. The DMT system and method provide seamless rate adaptation with the provision of different power levels. This framing and encoding method enables a system with seamless rate adaptation capability. The system and method of the invention can be implemented in hardware, or alternatively in a combination of hardware and software.

8 Claims, 5 Drawing Sheets

U.S. PATENT DOCUMENTS

| | | | |
|---|---|---|---|
| 5,048,054 A | | 9/1991 | Eyuboglu et al. |
| 5,128,964 A | | 7/1992 | Mallory |
| 5,206,886 A | | 4/1993 | Bingham |
| 5,226,081 A | | 7/1993 | Hinokimoto |
| 5,285,474 A | | 2/1994 | Chow et al. |
| 5,327,574 A | | 7/1994 | Monma et al. |
| 5,400,322 A | * | 3/1995 | Hunt et al. ............ 370/468 |
| 5,428,790 A | | 6/1995 | Harper et al. |
| 5,452,288 A | | 9/1995 | Rahuel et al. |
| 5,479,447 A | | 12/1995 | Chow et al. |
| 5,497,398 A | | 3/1996 | Tzannes et al. |
| 5,521,906 A | | 5/1996 | Grube et al. |
| 5,533,008 A | | 7/1996 | Grube et al. |
| 5,555,244 A | | 9/1996 | Gupta et al. |
| 5,596,604 A | | 1/1997 | Cioffi et al. |
| 5,598,435 A | | 1/1997 | Williams |
| 5,625,651 A | | 4/1997 | Cioffi |
| 5,636,246 A | | 6/1997 | Tzannes et al. |
| 5,644,573 A | | 7/1997 | Bingham et al. |
| 5,667,991 A | | 9/1997 | Koller et al. |
| 5,682,419 A | | 10/1997 | Grube et al. |
| 5,774,671 A | | 6/1998 | Satoh |
| 5,812,599 A | | 9/1998 | Van Kerckhove |
| 5,822,372 A | | 10/1998 | Emami |
| 5,822,374 A | | 10/1998 | Levin |
| 5,831,690 A | * | 11/1998 | Lyons et al. ........ 375/240.28 |
| 5,910,959 A | | 6/1999 | Olafsson et al. |
| 6,009,122 A | | 12/1999 | Chow |
| 6,011,814 A | | 1/2000 | Martinez et al. |
| 6,052,411 A | | 4/2000 | Mueller et al. |
| 6,072,779 A | | 6/2000 | Tzannes et al. |
| 6,084,917 A | | 7/2000 | Kao et al. |
| 6,091,713 A | | 7/2000 | Lechleider et al. |
| 6,122,247 A | * | 9/2000 | Levin et al. ............... 370/210 |
| 6,188,729 B1 | | 2/2001 | Perkins |
| 6,266,348 B1 | | 7/2001 | Gross et al. |
| 6,272,170 B1 | * | 8/2001 | Chu ........................ 375/222 |
| 6,426,961 B1 | | 7/2002 | Nimmagadda |
| 6,449,288 B1 | | 9/2002 | Chari et al. |
| 6,480,475 B1 | | 11/2002 | Modlin et al. |
| 6,498,808 B1 | | 12/2002 | Tzannes |
| 6,567,473 B1 | | 5/2003 | Tzannes |
| 6,665,872 B1 | | 12/2003 | Krishnamurthy et al. |
| 6,667,991 B1 | | 12/2003 | Tzannes |
| 6,775,320 B1 | | 8/2004 | Tzannes et al. |
| 6,778,596 B1 | | 8/2004 | Tzannes |
| 6,865,190 B2 | | 3/2005 | Abbas et al. |
| 6,885,696 B2 | | 4/2005 | Wingrove |
| 2004/0223510 A1 | | 11/2004 | Tzannes |
| 2004/0223511 A1 | | 11/2004 | Tzannes |
| 2005/0220202 A1 | | 10/2005 | Tzannes |
| 2007/0019755 A1 | | 1/2007 | Tzannes |
| 2007/0133704 A1 | | 6/2007 | Tzannes |

FOREIGN PATENT DOCUMENTS

| | | |
|---|---|---|
| EP | 0652677 | 5/1995 |
| EP | 0703685 | 3/1996 |
| EP | 753947 | 1/1997 |
| EP | 0753948 | 1/1997 |
| EP | 0762701 | 3/1997 |
| EP | 0812087 | 12/1997 |
| EP | 0820168 | 1/1998 |
| EP | 0828363 | 3/1998 |
| EP | 0833474 | 4/1998 |
| EP | 0840474 | 5/1998 |
| EP | 0869647 | 10/1998 |
| EP | 0905948 | 3/1999 |
| JP | 04022235 A | 1/1992 |
| JP | 5316111 A | 11/1993 |
| JP | 5327796 A | 12/1993 |
| JP | 7183862 A | 7/1995 |
| JP | 11127218 A | 5/1999 |
| JP | 2000558624 A | 7/2002 |
| WO | WO 86/07223 | 12/1986 |
| WO | WO 97/15131 | 4/1997 |
| WO | WO 97/36384 | 10/1997 |
| WO | WO 98/06186 | 2/1998 |
| WO | WO 98/10556 | 3/1998 |
| WO | WO 98/27665 | 6/1998 |
| WO | WO 98/57472 | 12/1998 |
| WO | WO 98/59476 | 12/1998 |
| WO | WO 99/16224 | 4/1999 |
| WO | WO 99/18701 | 4/1999 |
| WO | WO 99/20027 | 4/1999 |
| WO | WO 0002335 | 1/2000 |
| WO | WO 00/13387 | 3/2000 |
| WO | WO 01/13622 | 2/2001 |

OTHER PUBLICATIONS

Ying, Feria, "Seamless data-rate change using punctured convolutional codes for time-varying signal-to-noise ratio", ICC 95 Seattle, Gateway to Globalization, 1995 IEEE International Conference on Communications, 1995, vol. 1, Jun. 18-22, 1995 pp. 342-346 vol.*

ITU G.992.1, "Draft new Recommendation G.992.1: Asymmetrical Digital Subscriber Line (ADSL) Transceiver." ITU—Telecommunication Standardization Sector Temporary Document 44 (PLEN) Study Group 15 Original: English, Geneva, Oct. 12-23, 1998, pp. 13, 32 57-61, 126 and 153 (9 pages).*

ITU G.992.1 , "Draft new Recommendation G.992.1: Asymmetrical Digital Subscriber Line (ADSL) Transceiver." ITU—Telecommunication Standardization Sector Temporary Document 44 (PLEN) Study Group 15 Original: English, Geneva, Oct. 12-23, 1998.*

Atungsiri et al. "Multirate Coding for Mobile Communications Link Adoption," IEEE Proceedings: Communications, vol. 144, No. 3, Jun. 1, 1997, pp. 211-216 XP0006597581 ISSN: 1350-2425.

John A. C. Bingham, "Multicarrier Modulation for Data Transmission: An Idea Whose Time Has Come" May 1990—IEEE Communications Magazine pp. 5-14.

John A. C. Bingham, "RFI Suppression in Multicarrier Transmission Systems," Amati Communications, San Jose, CA, May 1996 IEEE Communications Magazine, pp. 1026-1030.

John M. Cioffi "A Multicarrier Premier" Amati Communications Corporation and Stanford University, pp. 1-18.

Yair Shoham et al. "Efficient Bit Allocation for an Arbitrary Set of Quantizers" IEEE Transactions on Acoustics, Speech, And Signal Processing; vol. 36, No. 9, Sep. 1988; pp. 1445-1453.

Office Action, mailed on Jan. 17, 2003, for U.S. Appl. No. 09/523,086.

Final Office Action, mailed on May 15, 2003, for U.S. Appl. No. 09/523,086.

Notice of Allowability, mailed Sep. 9, 2003, for U.S. Appl. No. 09/523,086.

Office Action, mailed May 23, 2002, for U.S. Appl. No. 09/522,869.

Notice of Allowability, mailed Aug. 9, 2002, for U.S. Appl. No. 09/522,869.

Office Action, mailed Jul. 31, 2002, for U.S. Appl. No. 09/522,870.

Notice of Allowability, mailed Jan. 15, 2003, for U.S. Appl. No. 09/522,870.

Office Action, mailed Jul. 11, 2007, for U.S. Appl. No. 10/863,246.

Office Action, mailed Jun. 4, 2003, for U.S. Appl. No. 10/351,402.

Final Office Action, mailed Jul. 21, 2009, for U.S. Appl. No. 12/044,498.

Search Report, mailed Mar. 30, 1999, for EP Application 08019583.7.

Search Report, mailed Dec. 29, 2000, for EP Application 965061.5.

Office Action, mailed Feb. 13, 2003, for AU Application 200038762.

Office Action, mailed Aug. 12, 2003, for AU Application 200075846.

Office Action, mailed Aug. 11, 2003, for AU Application 200075835.

Office Action, mailed Feb. 27, 2004, for AU Application 2003204966.

Office Action, mailed Aug. 11, 2006, for AU Application 2005200136.
Office Action, mailed Dec. 1, 2005, for EP Application 965061.5.
Office Action, mailed Oct. 11, 2007, for CA Application 2382522.
International Search Report, mailed Dec. 29, 2000, for PCT/US00/025387.
International Search Report, mailed Jul. 7, 2000, for PCT/US00/006392.
Office Action, mailed Jun. 27, 2006, for U.S. Appl. No. 11/409,336.
International Search Report, mailed Dec. 18, 2000, for PCT/US00/025352.
Office Action, mailed Jan. 16, 2003, for U.S. Appl. No. 10/145,054.
Office Action, mailed Jun. 20, 2003, for U.S. Appl. No. 10/145,054.
Office Action, mailed Jan. 29, 2004, for U.S. Appl. No. 10/145,054.
Office Action, mailed Jun. 18, 2004, for U.S. Appl. No. 10/145,054.
Office Action, mailed Jul. 14, 2004, for U.S. Appl. No. 10/653,271.
Office Action, mailed Nov. 24, 2006, for U.S. Appl. No. 10/663,801.
Office Action, mailed Jan. 23, 2006, for U.S. Appl. No. 11/246,162.
Office Action, mailed Mar. 7, 2005, for U.S. Appl. No. 10/962,589.
Office Action, mailed Jul. 12, 2005, for U.S. Appl. No. 11/144,645.
Office Action, mailed Apr. 4, 2007, for U.S. Appl. No. 11/675,369.
Office Action, mailed Nov. 15, 2006, for U.S. Appl. No. 11/543,843.
Office Action, mailed Sep. 7, 2007, for U.S. Appl. No. 10/863,247.
Office Action, mailed Nov. 22, 2006, for KR Application 10-2002-7003424.
Office Action, mailed Jan. 22, 2007, for EP Application 00965061.
Office Action, mailed Sep. 10, 2007, for CA Application 2382519.
Office Action, mailed Oct. 23, 2008, for U.S. Appl. No. 12/013,043.
Office Action, mailed Nov. 18, 2008, for U.S. Appl. No. 12/044,498.
Office Action, mailed Jan. 8, 2008, for U.S. Appl. No. 11/771,261.
Office Action, mailed Nov. 17, 2008, for CA Application 11/771,261.
Search Report, mailed Sep. 9, 2008, for EP Application 8012733.5.
Search Report, mailed Jul. 10, 2006, for EP Application 6007976.1.
Search Report, mailed Jul. 4, 2008, for Application 8009620.9.
"ITU-T—Recommendation G.992.2" International Telecommunication Union, Jun. 1999, 179 Pages.
Chow et al, "DMT-based ADSL: Concept, Architecture, and performance" IEEE Oct. 19, 1994, pp. 3/1-3/5, XPOO6503444.
Grover et al, "Simulation and Experimental Studies on the Concept of a Rate-Adaptive Digital Subscriber Loop (RA-DSL)" IEEE Journal on Selected Areas in Communication, IEEE Service Center, Piscataway, NJ, US, vol. 9, No. 6, Aug. 1991, pp. 941-950, XP001188185, USSN: 0733-8716.
Office Action, mailed Nov. 9, 2009, for U.S. Appl. No. 11/771,261.
Office Action, mailed Oct. 26, 2009, for JP Application No. 2007-234604.
Office Action, mailed Nov. 2, 2009, for JP Application No. 2007-060099.
Office Action, mailed Oct. 26, 2009, for JP Application No. 2000-604585.
Office Action, mailed Nov. 18, 2009, for U.S. Appl. No. 12/013,043.
Office Action, mailed Oct. 26, 2009, for JP Application No. 2001-524318.
Office Action, mailed Oct. 26, 2009, for JP Application No. 2007-212849.
"A series of new chipset models - Transmission scheme is bipolarized in CAP and DMT" Nikkei Electronics, Japan, Nov. 18, 1996, pp. 104-108.
"Dual PLL Synthesizer for PHS Cell Station", Yoshihisa Suzuki; Kenji Shibata and Junichi Kimurra, National Technical Report, Japan, Matsushita Electric Industrial Co., Ltd., Aug. 1996, vol. 42, No. 4, pp. 9-13.

* cited by examiner

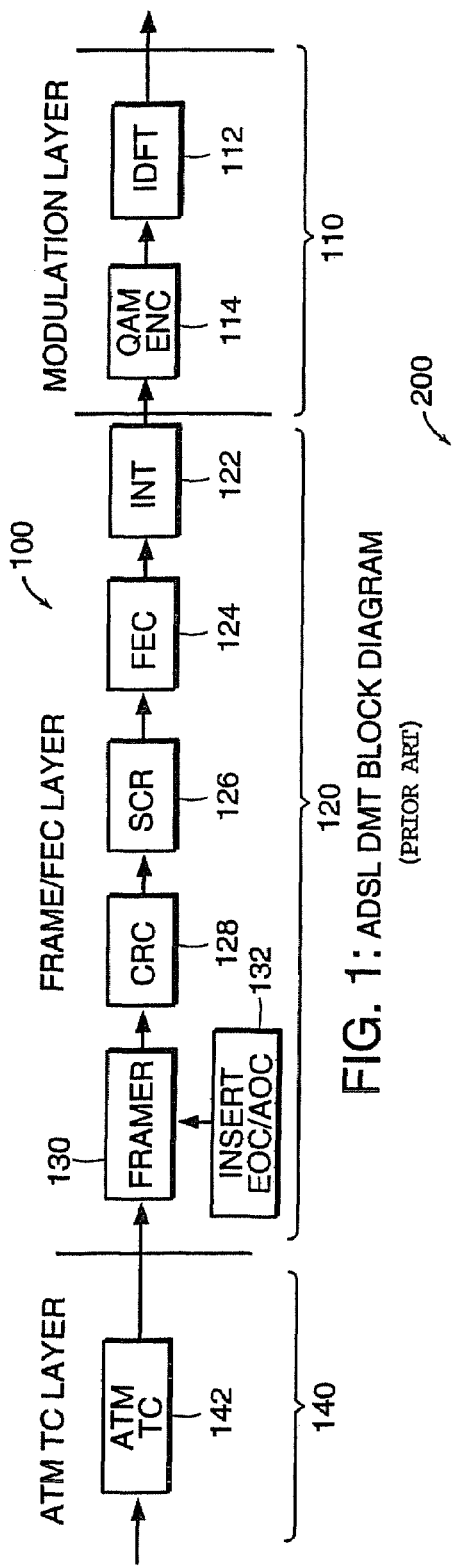
FIG. 1: ADSL DMT BLOCK DIAGRAM (PRIOR ART)
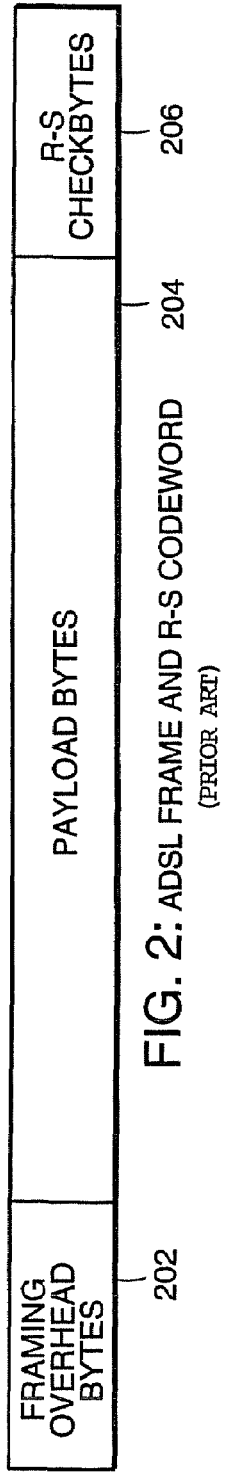
FIG. 2: ADSL FRAME AND R-S CODEWORD (PRIOR ART)
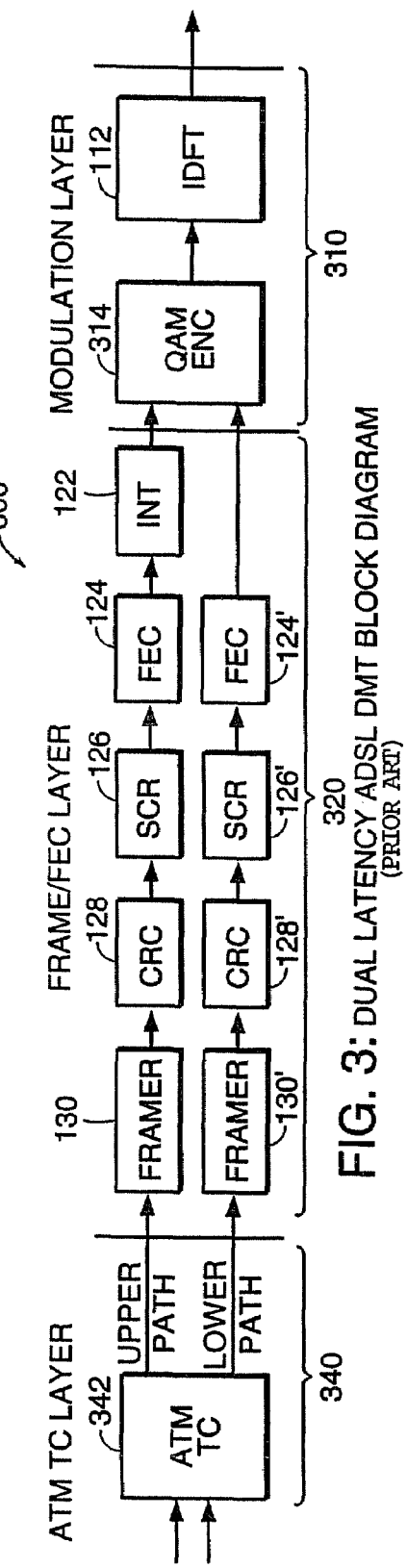
FIG. 3: DUAL LATENCY ADSL DMT BLOCK DIAGRAM (PRIOR ART)

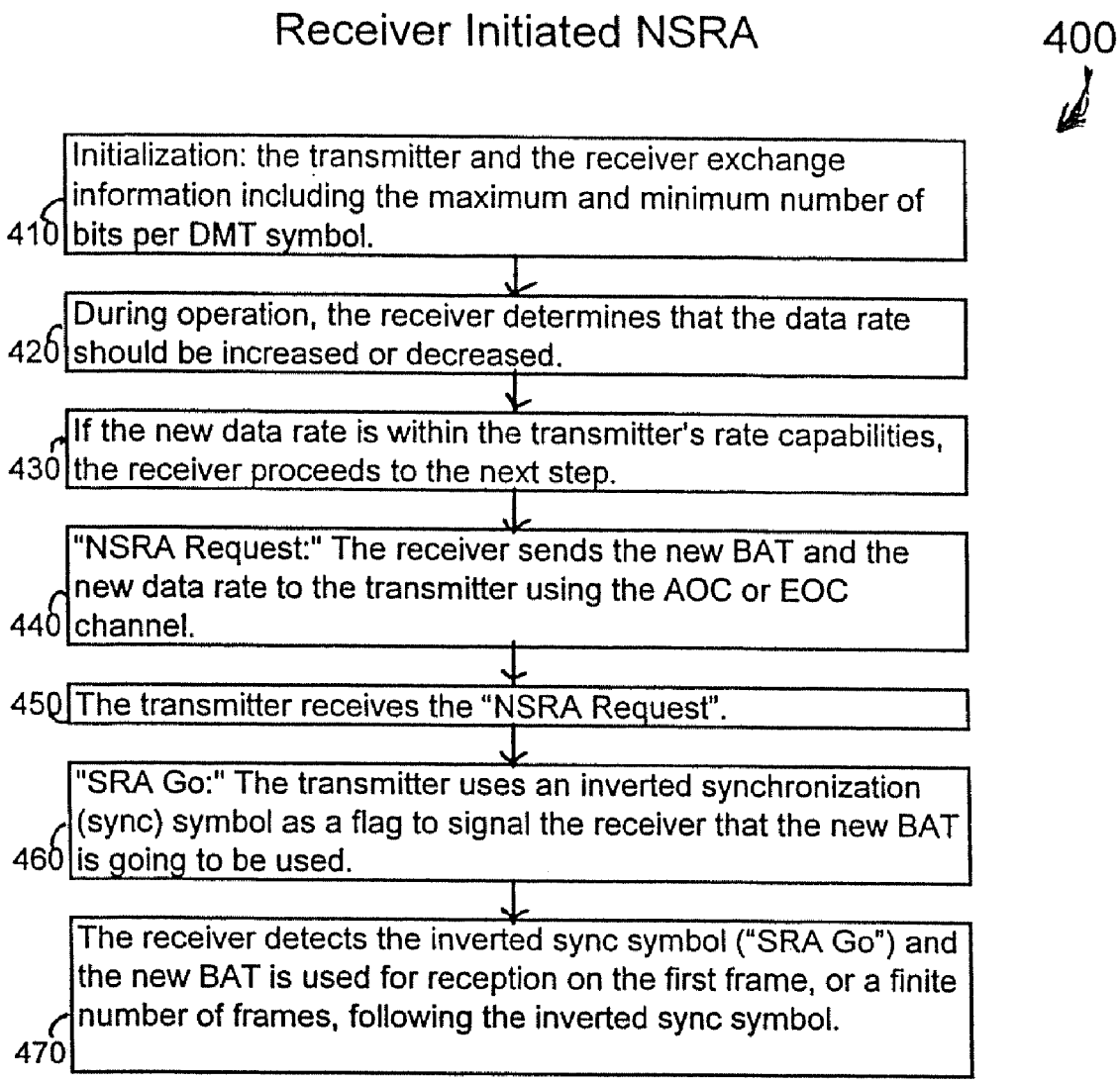

FIG. 5

Transmitter Initiated NSRA 500

510 | Initialization: The transmitter and the receiver exchange information including the maximum and minimum number of bits per DMT symbol.

520 | The transmitter determines that the data rate should be increased or decreased.

530 | If the new desired data rate is within the receiver's rate capability then the transmitter proceeds to the next step.

540 | "NSRA Request:" The transmitter sends to the receiver the new desired data rate using the EOC or AOC channel.

550 | The receiver receives the "NSRA request" message. If the channel can support the new data rate then the receiver proceeds to the next step. If the channel can not support the new data rate then the receiver sends an "SRA Deny' message back to the transmitter using the EOC or AOC channel.

560 | "NSRA Grant:" The receiver sends the new BAT to the transmitter using the AOC or EOC channel based on the new data rate.

570 | The transmitter receives the "NSRA Grant".

580 | "SRA Go:" The transmitter uses an inverted sync symbol as a flag to signal the receiver that the new BAT is going to be used. The new table is used for transmission on the first frame, or a finite number of frames, following the inverted sync symbol.

590 | The receiver detects the inverted sync symbol ("SRA Go") and the new table is used for reception on the first frame, or a finite number of frames, following the inverted sync symbol.

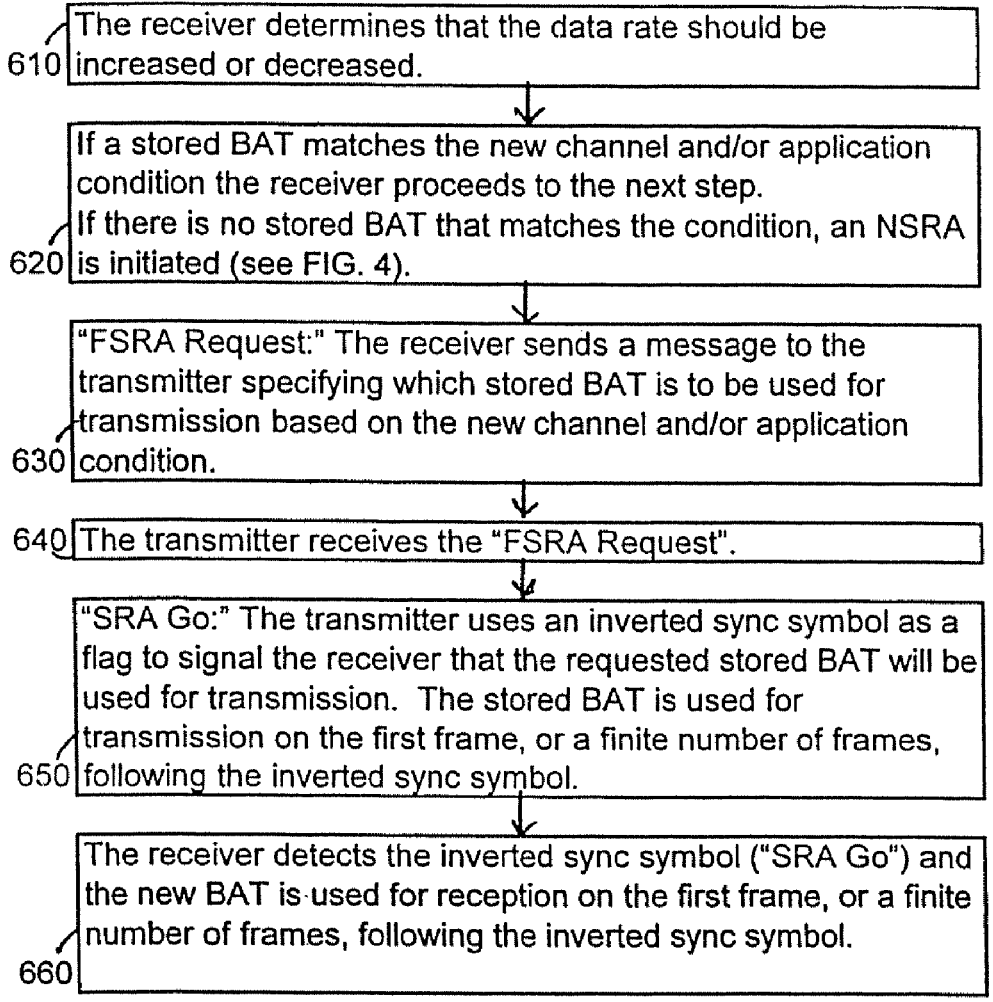

FIG. 6

Receiver Initiated FSRA      600

610 — The receiver determines that the data rate should be increased or decreased.

620 — If a stored BAT matches the new channel and/or application condition the receiver proceeds to the next step. If there is no stored BAT that matches the condition, an NSRA is initiated (see FIG. 4).

630 — "FSRA Request:" The receiver sends a message to the transmitter specifying which stored BAT is to be used for transmission based on the new channel and/or application condition.

640 — The transmitter receives the "FSRA Request".

650 — "SRA Go:" The transmitter uses an inverted sync symbol as a flag to signal the receiver that the requested stored BAT will be used for transmission. The stored BAT is used for transmission on the first frame, or a finite number of frames, following the inverted sync symbol.

660 — The receiver detects the inverted sync symbol ("SRA Go") and the new BAT is used for reception on the first frame, or a finite number of frames, following the inverted sync symbol.

FIG. 7

Transmitter Initiated FSRA

700

| | |
|---|---|
| 710 | The transmitter determines that the data rate should be increased or decreased. |
| 720 | If a stored BAT matches the new channel or/and application condition, the transmitter proceeds to the next step. If there are no stored BAT that matches the condition then an NSRA is initiated (see FIG. 5). |
| 730 | "FSRA Request:" The transmitter sends a message to the receiver specifying which stored BAT is to be used for transmission, based on the new channel and/or application condition. |
| 740 | The receiver receives the "FSRA Request". |
| 750 | The receiver sends back to the transmitter the "FSRA Grant" message to grant the "FSRA request". |
| 760 | The transmitter receives the "FSRA Grant". |
| 770 | "SRA Go:" The transmitter uses an inverted sync symbol as a flag to signal the receiver that the requested stored BAT will be used for transmission. The specified stored BAT is used for transmission on the first frame, or a finite number of frames, following the inverted sync symbol. |
| 780 | The receiver detects the inverted sync symbol ("SRA Go") and the new BAT is used for reception on the first frame, or a finite number of frames, following the inverted sync symbol. |

METHOD FOR SYNCHRONIZING SEAMLESS RATE ADAPTATION

RELATED APPLICATIONS

This application is a continuation application of Application Ser. No. 10/663,801 filed Sep. 17, 2003 now abandoned. Application Ser. No. 10/663,801 is a continuation application of Application Ser. No. 09/523,086 filed Mar. 10, 2000 now U.S. Pat. No. 6,667,991. Application No. 09/523,086 claims the benefit of and priority to U.S. provisional application Ser. No. 60/124,222, filed Mar. 12, 1999, entitled "Seamless Rate Adaptive (SRA) ADSL System", U.S. provisional application Ser. No. 60/161,115, filed Oct. 22, 1999, entitled "Multicarrier System with Stored Application Profiles", and U.S. provisional application Ser. No. 60/177,081, filed Jan. 19, 2000, entitled "Seamless Rate Adaptive (SRA) Multicarrier Modulation System and Protocols," which copending provisional applications are incorporated herein by reference in their entirety.

FIELD OF THE INVENTION

This invention relates generally to communication systems and methods using multicarrier modulation. More particularly, the invention relates to communication multicarrier systems and methods using rate adaptive multicarrier modulation.

BACKGROUND OF THE INVENTION

Multicarrier modulation (or Discrete Multitone Modulation (DMT)) is a transmission method that is being widely used for communication over difficult media. Multicarrier modulation divides the transmission frequency band into multiple subchannels (carriers), with each carrier individually modulating a bit or a collection of bits. A transmitter modulates an input data stream containing information bits with one or more carriers and transmits the modulated information. A receiver demodulates all the carriers in order to recover the transmitted information bits as an output data stream.

Multicarrier modulation has many advantages over single carrier modulation. These advantages include, for example, a higher immunity to impulse noise, a lower complexity equalization requirement in the presence of multipath, a higher immunity to narrow band interference, a higher data rate and bandwidth flexibility. Multicarrier modulation is being used in many applications to obtain these advantages, as well as for other reasons. Applications include Asymmetric Digital Subscriber Line (ADSL) systems, Wireless LAN systems, Power Line communications systems, and other applications. ITU standards G.992.1 and G.992.2 and the ANSI T1.413 standard specify standard implementations for ADSL transceivers that use multicarrier modulation.

The block diagram 100 for a standard compliant ADSL DMT transmitter known in the art is shown in FIG. 1. FIG. 1 shows three layers: the Modulation layer 110, the Framer/FEC layer 120, and the ATM TC layer 140, which are described below.

The Modulation layer 110 provides functionality associated with DMT modulation. DMT modulation is implemented using an Inverse Discrete Fourier Transform (IDFT) 112. The IDFT 112 modulates bits from the Quadrature Amplitude Modulation (QAM) 114 encoder into the multicarrier subchannels. ADSL multicarrier transceivers modulate a number of bits on each subchannel, the number of bits depending on the Signal to Noise Ratio (SNR) of that subchannel and the Bit Error Rate (BER) requirement of the link. For example, if the required BER is $1 \times 10^{-7}$ (i.e., one bit in ten million is received in error on average) and the SNR of a particular subchannel is 21.5 dB, then that subchannel can modulate 4 bits, since 21.5 dB is the required SNR to transmit 4 QAM bits with a $1 \times 10^{-7}$ BER. Other subchannels can have a different SNR and therefore may have a different number of bits allocated to them at the same BER. The ITU and ANSI ADSL standards allow up to 15 bits to be modulated on one carrier.

A table that specifies how many bits are allocated to each subchannel for modulation in one DMT symbol is called a Bit Allocation Table (BAT). A DMT symbol is the collection of analog samples generated at the output of the IDFT by modulating the carriers with bits according to the BAT. The BAT is the main parameter used in the Modulation layer 110 of FIG. 1. The BAT is used by the QAM 114 and IDFT 112 blocks for encoding and modulation. Table 1 shows an example of a BAT for a DMT system with 16 subchannels.

TABLE 1

Example of BAT for multicarrier system with 16 subchannels

| Subchannel Number | Bits per Subchannel |
|---|---|
| 1 | 5 |
| 2 | 9 |
| 3 | 3 |
| 4 | 2 |
| 5 | 4 |
| 6 | 0 |
| 7 | 5 |
| 8 | 7 |
| 9 | 8 |
| 10 | 3 |
| 11 | 0 |
| 12 | 5 |
| 13 | 6 |
| 14 | 8 |
| 15 | 4 |
| 16 | 3 |
| Total bits Per DMT symbol | 80 |

In ADSL systems the DMT symbol rate is approximately 4 kHz. This means that a new DMT symbol modulating a new set of bits, using the modulation BAT, is transmitted every 250 microseconds. If the BAT in table 1, which specifies 80 bits modulated in one DMT symbol, were used at a 4 kHz DMT symbol rate the bit rate of the system would be 4000*80=320 kilobits per second (kbps). The BAT determines the data rate of the system and is dependent on the transmission channel characteristics, i.e. the SNR of each subchannel in the multicarrier system. A channel with low noise (high SNR on each subchannel) will have many bits modulated on each DMT carrier and will thus have a high bit rate. If the channel conditions are poor, the SNR will be low and the bits modulated on each carrier will be few, resulting in a low system bit rate. As can be seen in Table 1, some subchannels may actually modulate zero bits. An example is the case when a narrow band interferer (such as AM broadcast radio) is present at a subchannel's frequency and causes the SNR in that subchannel to be too low to carry any information bits.

The ATM TC layer 140 includes an Asynchronous Transfer Mode Transmission Convergence (ATM TC) block 142 that transforms bits and bytes in cells into frames.

The next layer in an ADSL system is the Frame/FEC layer 120, which provides functionality associated with preparing a stream of bits for modulation, as shown in FIG. 1. This layer contains the Interleaving (INT) block 122, the Forward Error Correction (FEC) block 124, the scrambler (SCR) block 126, the Cyclic Redundancy Check (CRC) block 128 and the ADSL Framer block 130. Interleaving and FEC coding provide impulse noise immunity and a coding gain. The FEC 124 in the standard ADSL system is a Reed-Solomon (R-S) code. The scrambler 126 is used to randomize the data bits. The CRC 128 is used to provide error detection at the receiver. The ADSL Framer 130 frames the received bits from the ATM framer 142. The ADSL framer 130 also inserts and extracts overhead bits from module 132 for modem to modem overhead communication channels (known as EOC and AOC channels in the ADSL standards).

The key parameters in the Framer/FEC layer 120 are the size of the R-S codeword, the size (depth) of the interleaver (measured in number of R-S codewords) and the size of the ADSL frame. As examples, a typical size for an R-S codeword may be 216 bytes, a typical size for interleaver depth may be 64 codewords, and the typical size of the ADSL frame may be 200 bytes. It is also possible to have an interleaving depth equal to one, which is equivalent to no interleaving. In order to recover the digital signal that was originally prepared for transmission using a transmitter as discussed above, it is necessary to deinterleave the codewords by using a deinterleaver that performs the inverse process to that of the interleaver, with the same depth parameter. In the current ADSL standards there is a specific relationship between all of these parameters in a DMT system. Specifically, the BAT size, $N_{BAT}$ (total number of bits in a DMT symbol) is fixed to be an integer divisor of the R-S codeword size, $N_{FEC}$, as expressed in equation (1):

$$N_{FEC}=S \times N_{BAT}, \text{ where S is a positive integer greater than 0.} \quad (1)$$

This constraint can also be expressed as: One R-S codeword contains an integer number of DMT symbols. The R-S codeword contains data bytes and parity (checkbytes). The checkbytes are overhead bytes that are added by the R-S encoder and are used by the R-S decoder to detect and correct bit errors. There are R checkbytes in a R-S codeword. Typically, the number of checkbytes is a small percentage of the overall codeword size, e.g., 8%. Most channel coding methods are characterized by their coding gain, which is defined as the system performance improvement (in dB) provided by the code when compared to an uncoded system. The coding gain, of the R-S codeword depends on the number of checkbytes and the R-S codeword size. A large R-S codeword (greater than 200 bytes in a DMT ADSL system) along with a 16 checkbytes (8% of 200 bytes) will provide close to the maximum coding gain of 4 dB. If the codeword size is smaller and/or the percentage of checkbyte overhead is high (e.g. >30%) the coding gain may be very small or even negative. In general, it is best to have the ADSL system operating with the largest possible R-S codeword (the maximum possible is 255 bytes) and approximately 8% redundancy.

There is also a specific relationship between the number of bytes in an ADSL frame, $N_{FRAME}$, and the R-S codeword size, $N_{FEC}$ that is expressed in equation (2):

$$N_{FEC}=S \times N_{FRAME}+R; \text{ where R is the number of R-S checkbytes in a codeword and S is the same positive integer in Equation (1).} \quad (2)$$

It is apparent from equating the right-hand sides of equations (1) and (2) that the relationship expressed in equation (3) results $$N_{BAT}=N_{FRAME}+R/S. \quad (3)$$

The ADSL standard requires that the ratio (R/S) is an integer, i.e. there is an integer number of R-S checkbytes in every DMT-symbol ($N_{BAT}$). As described above, ADSL frames contain overhead bytes (not part of the payload) that are used for modem to modem communications. A byte in an ADSL frame that is used for the overhead channel cannot be used for the actual user data communication, and therefore the user data rate decreases accordingly. The information content and format of these channels is described in the ITU and ANSI standards. There are several framing modes defined in ADSL standards. Depending on the framing mode, there are more or fewer overhead bytes in one ADSL frame. For example, standard Framing Mode 3 has 1 overhead byte per ADSL frame.

Equations (1), (2) and (3) demonstrate that the parameter restrictions imposed by the standards result in the following conditions:

1. All DMT symbols have a fixed number of overhead framing bytes that are added at the ADSL framer. For example, in framing mode #3 there is 1 overhead framing byte per DMT symbol.
2. There is a minimum of 1 R-S checkbyte per DMT symbol.
3. The maximum number of checkbytes according to ITU Standard G.992.2 (8) and ITU Standards G.992.2 and T1.413 (16) limits the maximum codeword size to $8*N_{BAT}$ for G.992.2, and to $16*N_{BAT}$ for G.992.1 and T1.413.
4. An ADSL modem cannot change the number of bits in a DMT symbol ($N_{BAT}$) without making the appropriate changes to the number of bytes in a R-S codeword ($N_{FEC}$) and an ADSL frame ($N_{FRAME}$).

The above four restrictions cause performance limitations in current ADSL systems.

In particular, because of condition #1 every DMT symbol has a fixed number of overhead framing bytes. This is a problem when the data rate is low and the overhead framing bytes consume a large percentage of the possible throughput resulting in a lower payload. For example, if the date rate supported by the line is 6.144 Mbps, this will result in a DMT symbol with about 192 bytes per symbol (192*8*4000=6144000 bps). In this case, one overhead framing byte would consume 1/192 or about 0.5% of the available throughout. But if the date rate is 128 kbps or 4 bytes per symbol the overhead framing byte will consume ¼ or 25% of the available throughput. Clearly this is undesirable.

Condition #2 will cause the same problems as condition # 1. In this case, the overhead framing byte is replaced by the R-S checkbyte.

Condition #3 will not allow the construction of large codewords when the data rate is low. R-S codewords in ADSL can have a maximum of 255 bytes. The maximum coding gain is achieved when the codeword size is near the maximum 255 bytes. When the data rate is low, e.g. 128 kbps or 4 bytes per symbol, the maximum codeword size will be 8*4=32 bytes for G.992.2 systems and 16*4=64 bytes for G.992.1 and T1.413 systems. In this case the coding gain will be substantially lower than for large codewords approaching 255 bytes.

In general, if the data rate is low, e.g. 128 kbps or 4 byte per symbol, the above conditions will result in 1 byte being used for overhead framing, and 1 byte being consumed by a R-S checkbyte. Therefore 50% of the available throughput will not be used for payload and the R-S codeword size will be at most 64 bytes, resulting in negligible coding gain.

Condition #4 effects the ability of the modem to adapt its transmission parameters on-line in a dynamic manner.

G.992.1 and T1.413 specify a mechanism to do on-line rate adaptation, called Dynamic Rate Adaptation (DRA), but it is clearly stated in these standards that the change in data rate will not be seamless. In general current ADSL DMT modems use Bit Swapping and dynamic rate adaptation (DRA) as methods for on-line adaptation to channel changes. Bit Swapping is specified in the JTU and ANSI standards as method for modifying the number of bits allocated to a particular carrier. Bit Swapping is seamless, i.e., it does not result in an interruption in data transmission and reception. But, Bit Swapping does not allow the changing of data rates. Bit Swapping only allows the changing the number of bits allocated to carriers while maintaining the same data rate. This is equivalent to changing the entries in the BAT table without allowing the total number of bits (N.sub.BAT) in the BAT to increase or decrease.

DRA enables a change in data rate, but is not seamless. DRA is also very slow because it requires the modem located in the Central Office (CO) to make the final decision on the data rate configuration. This model, with (the CO being the master), is common among ADSL modems that are designed to provide a service offered by the telephone company, and controlled by the telephone company.

Both Bit Swapping and DRA use a specific protocol that is specified in ANSI T1.413, G.992.1 and G.992.2 for negotiating the change. This protocol negotiates the parameters using messages that are sent via an AOC channel, which is an embedded channel. This protocol is sensitive to impulse noise and high noise levels. If the messages are corrupted the transmitter and receiver can enter a state where they are using different transmission parameters (e.g., BAT, data rate, R-S codeword length, interleaver depth, etc). When two communication modems enter a state of mismatched transmission parameters, data will be received in error and the modems will eventually be required to take drastic measures (such as full reinitialization) in order to restore error free transmission. Drastic measures such as full reinitialization will result in the service being dropped for approximately 10 seconds, which is the time required for a standards compliant ADSL modem to complete a full initialization.

A transceiver has both a transmitter and a receiver. The receiver includes the receiver equivalent blocks of the transmitter shown in FIG. 1. The receiver has modules that include a decoder, a deinterleaver and a demodulator. In operation, the receiver accepts a signal in analog form that was transmitted by a transmitter, optionally amplifies the signal in an amplifier, filters the signal to remove noise components and to separate the signal from other frequencies, converts the analog signal to a digital signal through the use of an analog to digital converter, demodulates the signal to generate the received bits stream from the carrier subchannels by the use of a demodulator, deinterleaves the bits stream by the use of a deinterleaver, performs the FEC decoding to correct errors in the bit stream by use of an FEC decoder, descrambles the bit stream by use of a descrambler, and detects bit errors in the bit stream by use of a CRC. Various semiconductor chip manufacturers supply hardware and software that can perform the functions of a transmitter or a receiver, or both.

It is therefore apparent that there is a need for an improved DMT transmission system. It is therefore a principle object of the invention to provide an improved DMT transmission system that overcomes the problems discussed above.

SUMMARY OF THE INVENTION

According to the principles of the invention, ADSL DMT systems and methods are provided that change transmission bit rates in a seamless manner during operation. The ADSL DMT systems and methods operate according to protocols that allow the seamless change of transmission bit rates during operation to be initiated by either the transmitter or the receiver. The ADSL DMT systems and methods provide for seamless changes of transmission bit rates during operation that change transmission bit rates between power levels that range from full power to low power.

In one aspect, the invention relates to a method for seamlessly changing a transmission bit rate. The method employs a multicarrier transmission system that includes a transmitter and a receiver. The transmitter and receiver use a first bit allocation table to transmit a plurality of codewords at a first transmission bit rate, the plurality of codewords having a specified codeword size and including a specified number of parity bits for forward error correction, and a specified interleaving parameter for interleaving the plurality of codewords. The method involves transmitting a message to change the transmission bit rate from the first transmission bit rate to a second transmission bit rate. The method involves using a second bit allocation table at the receiver and at the transmitter for transmitting at the second transmission bit rate. The method includes synchronizing use of the second bit allocation table between the transmitter and receiver, and transmitting codewords at the second transmission bit rate using the same specified interleaving parameter, specified codeword size, and specified number of parity bits for forward error correction that are used to transmit codewords at the first transmission bit rate to achieve a seamless change in transmission bit rate.

In one embodiment, the message contains the second bit allocation table. In another embodiment, the receiver transmits the message to the transmitter. In still another embodiment, the method includes storing a plurality of bit allocation tables at the transmitter and at the receiver. In this embodiment, the message specifies which one of the stored bit allocation tables is to be used as the second bit allocation table. In a further embodiment, the transmitter transmits the message to the receiver. In another embodiment, the synchronizing includes sending a flag signal. In a further embodiment the flag signal is a predefined signal. In a still further embodiment, the predefined signal is a sync symbol with a predefined phase shift. In a different embodiment, the predefined signal is an inverted sync symbol.

In another embodiment, the method further involves using the first bit allocation table for transmitting a plurality of DMT symbols at the first transmission bit rate and switching to the second bit allocation table for transmitting the plurality of the DMT symbols at the second transmission bit rate. In this embodiment, the second bit allocation table is used for transmission starting with a predetermined one of the DMT symbols that follows the transmission of the flag signal. In another embodiment, the predetermined DMT symbol is the first DMT symbol that follows the transmission of the flag signal. In a further embodiment, the transmitter transmits the flag signal to the receiver. In a still further embodiment, the receiver transmits the flag signal to the transmitter. In yet a further embodiment, each bit allocation table specifies a transmission power level for each carrier subchannel. In another embodiment, each bit allocation table specifies an allocation of bits to carrier subchannels for each latency path in a multiple latency path multicarrier system.

BRIEF DESCRIPTION OF THE DRAWINGS

The objects and features of the invention can be better understood with reference to the drawings described below. The drawings are not necessarily to scale, emphasis instead generally being placed upon illustrating the principles of the invention.

FIG. 1 is a block diagram for a standard compliant ADSL DMT transmitter known in the prior art.

FIG. 2 is an exemplary embodiment of an ADSL frame and R-S codeword.

FIG. 3 is a block diagram for a dual latency ADSL DMT transmitter.

FIG. 4 is a flow chart that depicts an embodiment of a process in which a Normal Seamless Rate Adaptive (NSRA) transmission bit rate change is initiated by a receiver according to the principles of the invention.

FIG. 5 is a flow chart that depicts an embodiment of a process in which a Normal Seamless Rate Adaptive (NSRA) transmission bit rate change is initiated by a transmitter according to the principles of the invention.

FIG. 6 is a flow chart that depicts an embodiment of a process in which a Fast Seamless Rate Adaptive (FSRA) transmission bit rate change is initiated by a receiver according to the principles of the invention.

FIG. 7 is a flow chart that depicts an embodiment of a process in which a Fast Seamless Rate Adaptive (FSRA) transmission bit rate change is initiated by a transmitter according to the principles of the invention.

DETAILED DESCRIPTION

The principles of the invention may be employed using transceivers that include a transmitter, such as that described in FIG. 1 above, and a receiver. In general terns, an ADSL system includes both a transmitter and a receiver for each communication in a particular direction. In the discussion that follows, an ADSL DMT transmitter accepts digital input and transmits analog output over a transmission line, which can be a twisted wire pair, for example. The transmission can also occur over a medium that includes other kinds of wires, fiber optic cable, and/or wireless connections. In order to utilize the transmitted signal, a second transceiver at the remote end of the transmission line includes a receiver that converts the received analog signal into a digital data stream for use by devices such as computers or digital televisions, for example. For bidirectional communication using a pair of transceivers, each transceiver includes a transmitter that sends information to the receiver of the other member of the pair, and a receiver that accepts information transmitted by the transmitter of the other member of the pair.

This invention describes a DMT system with the capability to adapt the system bit rate on-line in a seamless manner. The DMT system also provides a robust and fast protocol for completing this seamless rate adaptation. The DMT system also provides a framing and encoding method with reduced overhead compared to conventional DMT systems. This new framing and encoding method also enables a system with seamless rate adaptation capability.

It may be desirable to change the modem data rate after training due to a change in the channel characteristics or because the application running over ADSL has changed. Examples of changing channel characteristics include changes in the noise on the line, changes in the crosstalk from other services in the bundle or on the same line, changes in the levels and presence of Radio Frequency Interference ingress, changes in the line impedance due to temperature changes, changes in the state of equipment on the line (e.g. a phone going from on-hook to off hook, or vice versa), and the like. Examples of changes in applications include power down modes for a PC, a user changing from Internet browsing to two-way video conferencing, a user changing from internet browsing to voice over DSL with or without internet browsing, and the like. It is often desirable or required to change the data rate of the modem. It is highly desirable that this data rate change occurs in a "seamless" manner, i.e., without data bit errors or an interruption in service. However DMT ADSL modems specified in the prior art standards are not capable of performing seamless data rate adaptation.

Condition #4 described previously, does not allow the size of the BAT to change without modifying the R-S coding, interleaving and framing parameters. If the BAT, and $N_{BAT}$, could be modified during operation, i.e., if more or fewer bits were allocated to carriers in a DMT symbol, the data rate could be changed. Condition #4 requires that when the number of bits $N_{BAT}$ in the BAT changes the size of the R-S codeword (and therefore interleaving parameters) must also be modified. Modifying the interleaving and coding parameters on-line requires re-initializing the interleaver. Re-initialization of the interleaver always results in a "flushing" of the interleave memory. This flushing of memory will result in data errors and the transition will not be seamless.

In order to allow a DMT ADSL transmission system to change data rate seamlessly, the invention relates to the following:

1. a more efficient method for framing and encoding the data, that results in less overhead data bits per DMT symbol, thereby increasing the user bit rate;
2. a new ADSL system with the ability to dynamically adapt the data rate on-line (e.g., during operation) in a seamless manner; and
3. a new robust and fast protocol for completing such a seamless rate adaptation, so a data rate change can occur successfully even in the presence of high levels of noise.

Constant Percentage Overhead Framing

In one embodiment, a framing method is described that decreases the overhead (non-payload) data in DMT ADSL systems. FIG. 2 shows a diagram 200 representative of an ADSL frame and R-S codeword that includes at least one framing overhead byte 202, one or more payload bytes 204, and one or more checkbytes 206. This framing method also enables seamless rate adaptation. As described above current ADSL systems place restrictions and requirements on the ADSL frames, R-S codewords and DMT symbols. A system implemented according to the principles of the invention de-couples ADSL frames and R-S codewords from DMT symbols. This decoupling results in a system that has lower overhead data per DMT symbol and also can complete online rate adaptations in a seamless manner. According to the principles of the invention, ADSL frames and R-S codewords are constructed to have the same length and to be aligned (see FIG. 2). The R-S codeword is made sufficiently large enough to maximize the coding gain. The size of the R-S codeword (and therefore ADSL frame) can be negotiated at startup or fixed in advance. A fixed number of R-S checkbytes and overhead framing bytes are included in an ADSL frame. These parameters can also be negotiated at startup or fixed in advance.

Unlike DMT symbols of the prior art, DMT symbols produced in accordance with the principles of the invention are not aligned with ADSL frames and R-S codewords. Also the number of bits in a DMT symbol depends solely on the data rate requirements and configurations and is de-coupled from the R-S codeword size, the interleaver depth and the ADSL frame size. The number of bits in a DMT symbol dictates the data rate of the modem independently of the other framing, coding or interleaving restrictions. Since overhead bytes are added at the ADSL frame layer, a DMT symbol does not necessarily contain a fixed number of overhead bytes. As the data rate gets lower, for example 128 kbps, the overhead data remains low. In particular, this framing method assigns a fixed percentage of overhead data to the data stream, rather than a fixed number of overhead bytes. This percentage does not change when the data rate of the modem changes, (as is the case with current ADSL modems). Consider the following examples of conventional standard compliant framing methods.

PRIOR ART EXAMPLE #1

The line capacity is 192 bytes per DMT symbol (6.144 Mbps). The codeword size is 192, which includes 16 checkbytes and 1 overhead framing byte, (assuming ANSI T1.413 framing mode #3). The total framing overhead (i.e., checkbytes+overhead framing bytes) per DMT symbol is 16+1=17, and therefore the framing overhead is 17/192=8.8% of the available throughput. In this case the framing overhead is reasonable.

PRIOR ART EXAMPLE #2

The line capacity is 4 bytes (128 kbps). The codeword is constructed from 16 DMT symbols and is 16*4=64 bytes. There are 16 R-S checkbytes (1 checkbyte per DMT symbol) and there is 1 overhead framing byte (assuming ANSI T1.413 framing mode #3). The total framing overhead (checkbytes+ overhead framing bytes) per DMT symbol is 1+1=2 bytes, and therefore the framing overhead is 2/4=50% of the available throughput. This is highly inefficient.

Examples of embodiments of the framing method of the invention provide the following results, called the Constant Percentage Overhead Method:

EXAMPLE #1

This is exactly the same as the standard compliant training example (Prior Art Example #1) given above. Codeword sizes, DMT symbol sizes and overhead are the same. Therefore the framing overhead is 17/192=8.8% of the available throughput as well.

EXAMPLE #2

The line capacity is 4 bytes (128 kbps). The codeword is constructed independently of the DMT symbol and therefore could be set to 192 bytes, (as an example). This is also the size of the ADSL frame. We use 16 R-S bytes and 1 overhead framing byte per codeword or ADSL frame. There are 192/4=48 DMT symbols in 1 codeword. The total overhead (checkbytes+overhead framing bytes) per 48 DMT symbols is 1+16=17 bytes or 17/48=0.35 bytes per 1 DMT symbol. The framing overhead is 0.35/4=8.8% of the available throughput.

From examples #1 and #2, it is apparent that the principles of the invention provide a method to achieve a framing overhead that is a constant percentage of the available throughput regardless of the data rate or the line capacity. In these examples, the framing overhead was 8.8% for both 6 Mbps and 128 kbps.

Seamless Rate Adaptation (SRA) System

Another benefit of the framing method described in this invention is that it enables seamless on-line rate adaptation. Seamless Rate Adaptation (SRA) is accomplished by changing the DMT symbol BAT, i.e. the number of bits allocated to each subchannel in the multicarrier system. As shown above modifying the BAT changes the number of bits per DMT symbol and results in a change in the data bit rate of the system. In one embodiment, the DMT symbol size is changed without modifying any of the RS coding, interleaving and framing parameters. This is possible because the Constant Percentage Overhead framing method described above removes the restrictions imposed by the prior art on the relation between DMT symbols and R-S codewords or ADSL frames. Since the R-S coding and interleaving parameters do not change, interleaver flushing and other problems associated with changing the parameters associated with these functions do not occur. The transceiver can adapt the data rate without errors or service interruption. The only parameter that needs to be adapted is the BAT.

The BAT needs to be changed at the transmitter and the receiver at exactly the same time, i.e., on exactly the same DMT symbol. If the transmitter starts using the new BAT for transmission before the receiver does, the data is not demodulated correctly and bit errors occur. Also, if the receiver changes to a new BAT before the transmitter does, the same errors can occur. For this reason the transition to the use of the new BAT for transmission and reception needs to be synchronized at the transmitter and the receiver. In one embodiment, the principles of the invention provide a protocol that enables the synchronized transition to the use of the new BAT.

It is also very important that this protocol is very robust in the presence of channel noise. For example, if the protocol fails and the receiver does not switch to the new BAT at the same time as the transmitter, then bit errors occur and the transition is not seamless. Furthermore, if the transmitter and receiver are using different BATs, it is very difficult to re-establish an error free link without performing a re-initialization of the connection, which results in an interruption in service of up to 10 seconds.

It is also important that the transition between BATs occurs very quickly, because the need to operate at a new data rate is usually instantaneous. As an example, at a constant data rate a sudden decrease in the channel SNR will increase the number of bits received in error. A change in data rate is required because of the reception of many bits in error. In this situation, it is desirable to change the data rate as soon as possible to get out of the state of receiving bits in error. As another example, a change in the applications being transported over the ADSL link can require a change in the data rate. For example if one user is browsing the Internet and then another user wishes to make a voice call over the flow of data bits using the Voice over DSL capability of the ADSL connection, it is necessary to quickly change the data rate of the system to accommodate the telephone call in addition to the existing traffic.

It is apparent from these requirements that it is necessary for the SRA protocol to provide:

a. a method for synchronizing the transmitter and receiver transition to the new BAT;

b. robust transition to the new data rate; and c. fast transition to the new data rate.

The principles of the invention provide two protocols that satisfy these requirements for seamless rate adaptation. The protocols are called the Normal SRA protocol and the Fast SRA protocol.

Normal SRA (NSRA) Protocol

Either the transmitter or the receiver can initiate the Normal SRA (NSRA) protocol.

Receiver Initiated NSRA

The receiver initiated NSRA involves the following steps:
1. During initialization the transmitter and the receiver exchange information describing their maximum and minimum data rate capabilities. This corresponds to the maximum and minimum number of bits per DMT symbol.
2. During operation, the receiver determines that the data rate should be increased or decreased.
3. If the new data rate is within the transmitter's rate capabilities, the receiver proceeds to step 4.
4. The receiver sends the new BAT and the new data rate to the transmitter using the AOC or EOC channel. This corresponds to "NSRA Request" by the receiver.
5. The transmitter receives the "NSRA Request".
6. The transmitter uses an inverted synchronization (sync) symbol as a flag to signal the receiver that the new BAT is going to be used. The new BAT is used for transmission on the first frame, or a finite number of frames, following the inverted sync symbol. The inverted sync symbol operates as a rate adaptation "SRA Go" message sent by the transmitter.
7. The receiver detects the inverted sync symbol ("SRA Go") and the new BAT is used for reception on the first frame, or a finite number of frames, following the inverted sync symbol.

FIG. 4 shows a flow chart 400 depicting an embodiment of a process in which a Normal Seamless Rate Adaptive (NSRA) transmission bit rate change is initiated by a receiver according to the principles of the invention. In FIG. 4, the steps described in action boxes 410 through 470 correspond to the preceding discussion.

Transmitter Initiated NSRA

The transmitter initiated NSRA involves the following steps:
1. During initialization the transmitter and the receiver exchange information describing their maximum and minimum capabilities regarding data rate. This corresponds to the maximum and minimum number of bits per DMT symbol.
2. The transmitter determines that the data rate should be increased or decreased.
3. if the new desired data rate is within the receiver's rate capability then the transmitter proceeds to step 4.
4. The transmitter sends to the receiver the new desired data rate using the EOC or AOC channel. This is an "NSRA Request" message.
5. The receiver receives the NSRA request message. If the channel can support the new data rate then the receiver proceeds to step 6. If the channel can not support the new data rate then the receiver sends an "SRA Deny' message back to the transmitter using the EOC or AOC channel.
6. The receiver sends the new BAT to the transmitter using the AOC or EOC channel based on the new data rate. This corresponds to an "NSRA Grant" request by the receiver.
7. The transmitter receives the "NSRA Grant".
8. The transmitter uses an inverted sync symbol as a flag to signal the receiver that the new BAT is going to be used. The new table is used for transmission on the first frame, or a finite number of frames, following the inverted sync symbol. The inverted sync signal operates as a rate adaptation "SRA Go" message sent by the transmitter.
9. The receiver detects the inverted sync symbol ("SRA Go") and the new table is used for reception on the first frame, or a finite number of frames, following the inverted sync symbol.

FIG. 5 shows a flow chart 500 depicting an embodiment of a process in which a Normal Seamless Rate Adaptive (NSRA) transmission bit rate change is initiated by a transmitter according to the principles of the invention. In FIG. 5, the steps described in action boxes 510 through 590 correspond to the preceding discussion.

The rate adaptation only involves changing the number of bits in a DMT symbol by changing the BAT, and not the R-S codeword size, interleaver depth, or the ADSL frame size. This can be done without any interruption in data flow or introduction of data errors.

This protocol of the invention is faster than conventional rate adaptation methods because it does not require an extended handshake between the transmitter and the receiver in order to approve the new transmission parameters and rates. No extended handshake is needed because the data rate capabilities are known in advance and negotiated during startup. Also, the other parameters (such as R-S codeword length, interleaver depth, etc) are not changed during the data rate change using the new framing method.

This protocol of the invention is more robust than conventional rate adaptation techniques because it does not use the EOC or AOC channel to send the "SRA Go" message for synchronizing the transition to the new data rate. In conventional rate adaptation techniques, messages sent over the EOC and AOC channel can easily become corrupted by noise on the line. These overhead channels are multiplexed into the data stream at the framer and therefore are transmitted with quadrature amplitude modulation over a finite number of DMT subchannels. Impulse noise or other noise that occurs on the line can easily cause bit errors in the AOC channel message; the message can be lost. If the "SRA Go" message is corrupted and not received by the receiver, then the receiver does not know if the SRA request was granted or not. The transmitter, on the other hand, assumes the "SRA Go" message was received and switches to the new data rate and transmission parameters. The receiver, which did not receive the grant message, does not know when to switch to the new rate. The modems are unsynchronized and data errors occur.

The protocol of the invention is robust because, unlike conventional rate adaptation techniques, the "SRA Go" message is not sent via an EOC or AOC message that can easily be corrupted. Instead the grant of the rate adaptation request is communicated via an inverted sync symbol. The sync symbol is defined in the ANSI and ITU standards as fixed non-data carrying DMT symbol that is transmitted every 69 symbols. The sync symbol is constructed by modulating all the DMT carriers with a predefined PN sequence using basic QPSK (2 bit QAM) modulation. This signal, which is used throughout the modem initialization process, has special autocorrelation properties that make possible the detection of the sync symbol and the inverted sync symbol even in highly noisy environments. An inverted sync symbol is a sync symbol in which the phase information in the QAM signal is shifted by 180 degrees. Other phase shifts (other than 180 degrees) of the sync symbol can be used as well for the SRA Go message. Using the sync symbol for the "SRA Go" message makes the rate adaptation protocol very robust even in the noisiest environments.

Fast SRA (FSRA) Protocol using Stored BATs

The Fast SRA (FSRA) protocol seamlessly changes the data rate on the line faster than the NSRA protocol. This is important for certain applications that are activated and de-activated instantaneously over time or when sudden channel changes occur. In the FSRA protocol, "stored BATs" are used to speed up the SRA handshake and enable quick changes in data rate. Unlike profiles used in G.992.2, the stored BAT does not contain the R-S coding and interleaving parameters since these parameters are not effected when a rate change occurs using constant percentage overhead framing.

The BATs are exchanged using NSRA described in the previous section. After the one time NSRA is complete, and a BAT that is based on that particular channel condition or application condition is stored by both transceivers, the FSRA protocol can use the stored BAT to complete fast on-line rate adaptation. Stored BATs are labeled so that both the transmitter and receiver simply need to notify the other which table is to be used without actually having to transmit the information again. For example, the stored BAT may be numbered. The transmitter or receiver simply needs to tell the other transceiver which BAT table number is to be used for subsequent transmission. Either the receiver or the transmitter can initiate the FSRA protocol.

Receiver-Initiated FSRA

The receiver-initiated FSRA protocol involves the following steps:
1. The receiver determines that the data rate should be increased or decreased.
2. If a stored BAT matches the new channel and/or application condition the receiver proceeds to step 3. If there is no stored BAT that matches the condition, an NSRA is initiated (as described above).
3. The receiver sends a message to the transmitter specifying which stored BAT is to be used for transmission based on the new channel and/or application condition. This corresponds to an "FSRA Request" by the receiver.
4. The transmitter receives the "FSRA Request".
5. The transmitter uses an inverted sync symbol as a flag to signal the receiver that the requested stored BAT will be used for transmission. The stored BAT is used for transmission on the first frame, or a finite number of frames, following the inverted sync symbol. The inverted sync signal corresponds to a rate adaptation "SRA Go" message sent by the transmitter.
6. The receiver detects the inverted sync symbol ("SRA Go") and the new BAT is used for reception on the first frame, or a finite number of frames, following the inverted sync symbol.

FIG. 6 shows a flow chart 600 depicting an embodiment of a process in which a Fast Seamless Rate Adaptive (FSRA) transmission bit rate change is initiated by a receiver according to the principles of the invention. In FIG. 6, the steps described in action boxes 610 through 660 correspond to the preceding discussion.

Transmitter-Initiated FSRA

The transmitter-initiated FSRA protocol involves the following steps:
1. The transmitter determines that the data rate should be increased or decreased.
2. If a stored BAT matches the new channel or/and application condition, the transmitter proceeds to step 3. If there are no stored BAT that matches the condition then an NSRA is initiated (as described above).
3. The transmitter sends a message to the receiver specifying which stored BAT is to be used for transmission, based on the new channel and/or application condition. This corresponds to an "FSRA Request" by the transmitter.
4. The receiver receives the "FSRA Request".
5. The receiver sends back to the transmitter the "FSRA Grant" message to grant the "FSRA request".
6. The transmitter receives the "FSRA Grant".
7. The transmitter uses an inverted sync symbol as a flag to signal the receiver that the requested stored BAT will be used for transmission. The specified stored BAT is used for transmission on the first frame, or a finite number of frames, following the inverted sync symbol. The inverted sync signal corresponds to a rate adaptation "SRA Go" message sent by the transmitter.
8. The receiver detects the inverted sync symbol ("SRA Go") and the new BAT is used for reception on the first frame, or a finite number of frames, following the inverted sync symbol.

FIG. 7 shows a flow chart 700 depicting an embodiment of a process in which a Fast Seamless Rate Adaptive (FSRA) transmission bit rate change is initiated by a transmitter according to the principles of the invention. In FIG. 7, the steps described in action boxes 710 through 780 correspond to the preceding discussion.

The FSRA protocol can be completed very quickly. It requires only the exchange of two messages (FSRA grant and FSRA Request) and an inverted sync symbol. FSRA is faster than NSRA because the BAT is stored and need not be exchanged. As in the NSRA protocol, the FSRA protocol is also very robust in noisy environments since it uses inverted sync symbols for the "SRA Go".

Use of SRA Protocols for Power Management (Entering and Exiting Low Power Modes)

Full power mode is used during normal operations of the transceiver. Low power transmission modes are often used in transceivers in order to conserve power in cases when data does not need to be transmitted over the line. Many modems have low power modes or "sleep" modes that enable a transceiver to operate at a significantly lower power level when the transmission requirements are reduced. Many modems also have protocols that enable them to enter and exit these low power modes very quickly so that the user is not negatively effected by the modem's transition into the low power mode state. The SRA protocols provided of the invention are used to enter and exit from low power modes in a very fast and seamless manner.

There are two basic types of low power mode (LPM):

Low Data Rate LPM

This is low power mode with a very low data rate (e.g. 32 kbps). Only a few of the subchannels are active. The data connection is maintained. The pilot tone may also be transmitted in order to maintain loop timing.

Zero Data Rate LPM

This is a low power mode with an effectively 0 kbps data rate, i.e., no subchannels are modulating data. A data connection is not maintained. The pilot tone may also be transmitted in this case in order to maintain loop timing.

In both the Low Data Rate LPM and the Zero Data Rate LPM, the sync symbol, which is sent in normal fill power mode every 69 symbols, may be on or off. If the sync symbol is still transmitted during the low power mode, the receiver can use the sync symbol to monitor for channel changes and other fluctuations on the line. However transmission of the sync symbol every 69 symbols can cause non-stationary crosstalk and could be detrimental to other signals on the same telephone wire or in the same wire bundle. If the sync symbol is not transmitted during low power mode, there is no non-stationary crosstalk on the telephone wire or the wire bundle. However, in this case the receiver is not able to monitor the channel with the sync symbol.

Entering Low Power Mode using FSRA

1. Receiver-Initiated Transition into Low Power Mode

The receiver initiates the transition to low power mode using the receiver-initiated FSRA protocol. A receiver initiating the transition to low power mode uses a stored BAT corresponding to the low power mode. The stored BAT table for the low power mode may enable either a Low Data Rate LPM or a Zero Data Rate LPM. The low power mode BAT can be predefined by the system or can be exchanged and stored using the NSRA process. In either case the receiver uses the receiver-initiated FSRA protocol to designate the low power mode BAT and synchronously switch to using that BAT for transmission.

2. Transmitter-Initiated Transition into Low Power Mode

There are two ways the transmitter can use the transmitter-initiated FSRA protocol to enter into the low power mode. In one embodiment, the transmitter can use the entire transmitter-initiated FSRA process and request the transition. As in the case of receiver-initiated transition into low power mode, transmitter initiating the transition to low power mode uses a stored BAT for the low power mode. The stored BAT table for the low power mode can enable either a Low Data Rate LPM or a Zero Data Rate LPM. The low power mode BAT can be predefined by the system or can be exchanged and stored using the NSRA process. In either case the transmitter uses the transmitter-initiated FSRA protocol to designate the low power mode BAT and synchronously switches to the low power mode using that BAT for transmission.

In a second embodiment, the transmitter can transition directly to step 7 of the transmitter initiated FSRA protocol described above, and send the inverted sync symbol to indicate transition into the low power mode. The receiver detects the inverted sync and transitions to the low power mode. In this case, since an FSRA request has not been sent by the transmitter, the receiver recognizes that an inverted sync symbol received without a FSRA request transmitted indicates that the transmitter is switching to low power mode. The low power mode BAT is (predefined by the system) or is identified and stored previously so that both the transmitter and the receiver use the BAT. In an alternative second embodiment, in step 7 the transmitter sends a different signal that is predefined by the transmitter and the receiver to be the signal used for transition into low power mode without an "FSRA request." For example, the transmitter may send a sync symbol with 45 degree phase rotation, rather than the inverted (180 degree) sync symbol. A sync symbol with a 45 degree phase rotation indicates that the transmitter is transitioning into low power mode using the stored BAT associated with the low power mode on the first frame, or a finite number of frames, following the sync symbol with a 45 degree rotation.

The transmitter-initiated entry into low power mode as defined in the second embodiment has the advantage that it does not require the reverse channel to make the transition. The reverse channel is defined as the communications channel in the opposite direction, i.e., here, the communications channel used to send the FSRA messages from the receiver to the transmitter. This is advantageous because the reverse channel may already be in low power mode with no data connection. If there is no data ready to be sent the transmitter can simply transition to low power mode. This is an important power savings technique since the transmitter consumes a large portion of the power, as it is required to send the signal down the line. Transmitter-initiated transition into low power modes is also useful in "soft modem" (PC host based) implementations. In a soft modem implementation, the host processor is performing the modem transceiver functions and many other PC applications at the same time. If the host processor must perform another task that does not allow it to run the ADSL transmitter, the processor can quickly transition the transmitter to the low power mode by sending the inverted sync symbol, or the sync symbol with 45 degree rotation. After this the host processor resources can be consumed by the other task. The ADSL transmitter sends no signal (0 kbps) onto the line.

The transmitter-initiated and receiver-initiated protocols described above enable the communication system to enter a low power mode in each direction (upstream and downstream) separately or in both directions together. The cases described above each focus on one direction. The protocols can be combined to accomplish transition in both directions at the same time. As an example, assume that the customer premise transceiver (CPT) is designed to enter into a low power mode in response to a PC that is also entering a similar state. The CPT first uses receiver-initiated low power mode transition to put the downstream (CO to CPT direction) into low power mode. Afterwards the CPT uses the transmitter-initiated low power mode transition to put the upstream (CPT to CO direction) into low power mode.

Exiting Low Power Mode

1. Receiver-Initiated Exit from Power Mode

According to the SRA protocols, there are two embodiments the receiver can use to exit the low power mode-. In the first embodiment, receiver-initiated exit from low power mode can be accomplished using the receiver initiated NSRA or FSRA protocol if the low power mode still has at least a slow data connection in the reverse direction (Low data rate LPM). This is necessary because the receiver must be capable of sending the SRA request back to the transmitter along with the BAT to be used. If the transmitter has not turned off the sync symbol in low power mode the NSRA or FSRA protocols would be used as described above. If the transmitter sync symbol is turned off while in low power mode, the "SRA Go" is sent by the transmitter by turning the sync symbol back on. The receiver detects the presence of the sync symbol (with or without inversion) as a flag to synchronize the change in data rate.

In a second embodiment, there is no data connection in the reverse direction (Zero Data Rate LPM). The receiver initiates an exit by first completing a "transmitter-initiated exit from low power mode' (described below) in the reverse direction. This enables the data connection in the reverse direction. The receiver uses the receiver initiated NSPA or FSRA protocol to exit from low power mode in it's own direction. As described above, if the transmitter sync symbol is turned off while in low power mode, the "SRA Go" is sent by the transmitter by turning the sync symbol back on. The receiver detects the presence of the sync symbol (with or without inversion) as a flag to synchronize the change in data rate.

2. Transmitter-Initiated Exit from Low Power Mode

According to the SRA protocols, there are two embodiments the transmitter can use to exit from low power mode. In the first embodiment, the transmitter uses the entire transmitter initiated FSRA or NSRA process and requests the transition. This requires that there is a data connection in both directions (Low data rate LPM) so the protocol messages can be exchanged. As in the receiver-initiated exit from low power mode, if the transmitter has not turned off the sync symbol in low power mode the NSRA or FSRA protocols would be used as described above. If the transmitter had turned the sync symbol off while in low power mode, then the "SRA Go" is sent by the transmitter by turning the sync symbol back on. The receiver detects the presence of the sync symbol (with or without inversion) as a flag to synchronize the change in data rate.

In the second embodiment, the transmitter can exit the low power mode by transitioning directly to step 7 of the transmitter initiated FSRA protocol. The transmitter sends the inverted sync symbol to indicate transition out of the low power mode. This requires that a sync symbol be sent during the low power mode. This protocol does not require a low data rate LPM. The receiver detects the inverted sync and exits the low power mode. The receiver is designed to recognize that an inverted sync symbol received without a FSRA request indicates the transmitter is exiting from low power mode. The full power mode BAT is identified and stored previously in the connection so that both the transmitter and the receiver have the BAT. For example, the BAT to be used upon exiting a low power mode can be defined by the system to default to the BAT of the last full power connection. Alternatively, the transmitter can send a different signal that is predefined by the transmitter and the receiver to be the signal used for transition out of low power mode without an "FSRA request". For example, the transmitter can send a sync symbol with 45 degree phase rotation, rather than the inverted (180 degree) sync symbol. When the receiver detects the sync symbol with a 45 degree phase rotation, the receiver recognizes that the transmitter is transitioning out of low power mode using the stored BAT associated with the full power mode on the first frame, or a finite number of frames, following the sync symbol with a 45 degree rotation. If the transmitter had turned the sync symbol off while in low power mode, then the "SRA Go" is sent by the transmitter by turning the sync symbol back on. The receiver detects the presence of the sync symbol (with or without a phase shift) as a flag to synchronize the change in data rate.

Although throughout this description the BAT is defined to be a table that specifies the number of bits allocated to each subchannel, the BAT can also contain other parameters associated with allocating bits to subchannels in a multicarrier system. An example of an additional parameter is the Fine Gain per subchannel as defined in the ANSI and ITU standards. In this case, when the BAT is exchanged during the NSRA protocol or the BAT is stored during the FSRA protocol, the BAT also contains the Fine Gain value for each subchannel.

The seamless rate adaptive system and associated protocols also applies to DMT systems that implement dual (or multiple) latency paths. A dual latency system is defined in the ITU and ANSI standards as a DMT system that supports two data streams with different latency specifications in the Framer/FEC block. FIG. 3 shows a standard ADSL DMT system 300 that implements dual latency, as an example of a system having a plurality of latencies. The system 300 includes three layers: the Modulation layer 310, the Framer/FEC layer 320, and the ATM TC layer 340, which are similar but not identical to the three layers described above in relation to FIG. 1.

The Modulation layer 310 provides functionality associated with DMT modulation. The DMT modulation is implemented using a Inverse Discrete Fourier Transform (IDFT) 112. The IDFT 112 modulates bits from the dual input Quadrature Amplitude Modulation (QAM) 314 encoder into the multicarrier subchannels. The operation of the Modulation layer 310 is analogous to that of Modulation layer 110 of FIG. 1, with the difference that the Modulation layer 310 has multiple inputs, rather than only one input.

The Frame/FEC layer 320 shown in FIG. 3 has two paths. This layer contains a first path that includes the same blocks as in the Frame/FEC layer 120 of FIG. 1, namely the Interleaving (INT) block 122, the Forward Error Correction (FEC) block 124, the scrambler (SCR) block 126, the Cyclic Redundancy Check (CRC) block 128 and the ADSL Framer block 130. The layer further contains a second path that includes a second one of each of the Forward Error Correction (FEC) block 124', the scrambler (SCR) block 126', the Cyclic Redundancy Check (CRC) block 128' and the ADSL Framer block 130'. The Frame/FEC layer 320 provides functionality associated with preparing a stream of bits for modulation, The new lower path through the Framer/FEC layer 320 has a different amount of latency than the original upper path corresponding to FIG. 1, because the lower path does not perform interleaving on the data stream. Dual latency is used to send different application bit streams with different latency requirements through the ADSL DMT modem. As an example, an application that can tolerate high latency (e.g., video on demand) may be sent through the upper high latency path with interleaving whereas the an application with low latency requirements (e.g., voice) may be sent through the lower low latency path without interleaving.

The ATM TC layer 340 includes an ATM TC block 342 having multiple inputs and multiple outputs that transforms bits and bytes in cells into frames for each path.

The seamless rate adaptation system and method of the present invention applies to a system with dual latency, or even multiple latency, as well. In the case of dual latency, the FEC and interleaving parameters for both paths are decoupled from the DMT symbol size. The BAT contains, in addition to the number of bits allocated to each subchannel, the data rate for each latency path in the form of bits per DMT symbol. When seamless rate adaptations are performed using the FSRA and NSRA protocols the BAT also indicates the data rate for each latency path. For example, if the dual latency system runs with 1.536 Mbps on the interleaved path (high latency upper path) and 256 kbps in the non-interleaved path (low latency lower path) and an SRA is initiated, then the SRA protocol specifies the new BAT containing the number of bits per subchannel and also the new data rate for each latency path. At a 4 kHz DMT symbol rate, a system running at 1.536 Mbps+256 kbps=1.792 Mbps 1792000/4000=448 total bits per symbol. The BAT specifies that 1536000/4000=384 bits per symbol are allocated to the interleaved path and 256000/4000=64 bits per symbol are allocated to the non-interleaved path. In the example, when an SRA is performed, the new data rate for the interleaved path can be 1.048 Mbps (1048000/4000=262 bits per symbol) and the new data rate for the non-interleaved path can be 128 kbps (128000/4000=32 bits per DMT symbol), resulting in a total throughput rate of 1.176 kbps (or 294 total bits per DMT symbol). The NSRA and FSRA protocols combined with the framing method specified herein complete this data rate change in both latency paths in a seamless manner. It is also possible to not change the data rate on both latency paths. For example one may want to keep the 256 kbps low latency path at a constant data rate because it is carrying voice data (multiple telephone calls) that can not operate at a lower rate, whereas the 1.536 Mbps path may be carrying internet access data that can tolerate a rate change. In this example, during the SRA the data rate of the low latency path is kept constant at 256 kbps whereas the data rate of the high latency path changes.

While the invention has been disclosed in connection to ADSL systems it can also be applied to any system that utilizes multicarrier modulation. In general this invention applies to any system in which different numbers of bits are modulated on the carriers.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. In a multicarrier a transceiver, a method for seamlessly changing transmission parameters comprising:
   transmitting a plurality of codewords, the plurality of codewords having a specified codeword size and including a specified number of parity bits for forward error correction;
   transmitting or receiving a message to change at least one transmission parameter; and
   seamlessly transitioning to transmitting the plurality of codewords using the at least one changed transmission parameter, wherein the seamless transition is based on a sync symbol or an inverted sync symbol.

2. method of claim 1, further comprising:
   transmitting or receiving the sync symbol or the inverted sync symbol; and
   wherein said seamlessly transitioning to transmitting a plurality of codewords using the at least one changed transmission parameter includes seamlessly transitioning to transmitting using the at least one changed transmission parameter on a frame, wherein the frame immediately succeeds said transmitting or receiving the sync symbol or the inverted sync symbol.

3. The method of claim 1, wherein said seamlessly transitioning to transmitting a plurality of codewords using the at least one changed transmission parameter includes keeping an interleaver depth and a frame size unchanged before and after said transitioning.

4. The method of claim 1, wherein the sync symbol or the inverted sync symbol comprises a predefined pseudorandom noise sequence modulated across a plurality of carriers.

5. In a multicarrier a transceiver, a method for seamlessly changing reception parameters comprising:
   receiving a plurality of codewords, the plurality of codewords having a specified codeword size and including a specified number of parity bits for forward error correction;
   transmitting or receiving a message to change at least one reception parameter; and
   seamlessly transitioning to receiving the plurality of codewords using the at least one changed reception parameter, wherein the seamless transition is based on a sync symbol or an inverted sync symbol.

6. The method of claim 5, further comprising:
   transmitting or receiving the sync symbol or the inverted sync symbol; and
   wherein said seamlessly transitioning to receiving a plurality of codewords using the at least one changed reception parameter includes seamlessly transitioning to receiving using the at least one changed reception parameter on a frame, wherein the frame immediately succeeds said transmitting or receiving the sync symbol or the inverted synch symbol.

7. The method of claim 5, wherein said seamlessly transitioning to receiving a plurality of codewords using the at least one changed reception parameter includes keeping an interleaver depth and a frame size unchanged before and after said transitioning.

8. The method of claim 5, wherein the sync symbol or the inverted sync symbol comprises a predefined pseudorandom noise sequence modulated across a plurality of carriers.

* * * * *

UNITED STATES PATENT AND TRADEMARK OFFICE
CERTIFICATE OF CORRECTION

| | | |
|---|---|---|
| PATENT NO. | : 7,649,928 B2 | Page 1 of 1 |
| APPLICATION NO. | : 11/678388 | |
| DATED | : January 19, 2010 | |
| INVENTOR(S) | : Marcos C. Tzannes | |

It is certified that error appears in the above-identified patent and that said Letters Patent is hereby corrected as shown below:

Title Page, item 56, under "OTHER PUBLICATIONS" section, page 3, line 31, "for CA Application 11/771,261" should read --for US Application 11/771,261--.

Column 19, line 27, "2. method of" should read --2. The method of--.

Signed and Sealed this

Eighteenth Day of May, 2010

David J. Kappos
*Director of the United States Patent and Trademark Office*